United States Patent
Motosugi et al.

(10) Patent No.: US 8,694,189 B2
(45) Date of Patent: Apr. 8, 2014

(54) VIBRATION-INHIBITION CONTROL APPARATUS FOR ELECTRICALLY DRIVEN VEHICLE, AND VIBRATION-INHIBITION CONTROL METHOD FOR ELECTRICALLY DRIVEN VEHICLE

(75) Inventors: Jun Motosugi, Machida (JP); Satoru Fujimoto, Kawasaki (JP); Hiroyuki Ashizawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/811,394

(22) PCT Filed: Jul. 21, 2011

(86) PCT No.: PCT/JP2011/066541
§ 371 (c)(1),
(2), (4) Date: Feb. 27, 2013

(87) PCT Pub. No.: WO2012/011521
PCT Pub. Date: Jan. 26, 2012

(65) Prior Publication Data
US 2013/0184918 A1 Jul. 18, 2013

(30) Foreign Application Priority Data
Jul. 23, 2010 (JP) .................................. 2010-166207

(51) Int. Cl.
*B60L 11/00* (2006.01)
*F16F 11/00* (2006.01)

(52) U.S. Cl.
USPC .......................................................... 701/22

(58) Field of Classification Search
None
See application file for complete search history.

(56) References Cited

U.S. PATENT DOCUMENTS

| | | | |
|---|---|---|---|
| 6,806,667 B1* | 10/2004 | Sasaki et al. | 318/432 |
| 7,110,867 B2* | 9/2006 | Imazu | 701/22 |
| 7,482,769 B2* | 1/2009 | Kutsuna et al. | 318/254.1 |
| 2002/0190683 A1* | 12/2002 | Karikomi et al. | 318/632 |
| 2006/0017414 A1* | 1/2006 | Joe et al. | 318/432 |

(Continued)

FOREIGN PATENT DOCUMENTS

| | | |
|---|---|---|
| JP | 2003-009566 A | 1/2003 |
| JP | 2009-273328 A | 11/2009 |
| JP | 2009-294879 A | 12/2009 |
| JP | 2010-200587 A | 9/2010 |

OTHER PUBLICATIONS

IEEE search performed on Jan. 8, 2014. Search history included.*

*Primary Examiner* — John R Olszewski
*Assistant Examiner* — Navid Ziaeianmehdizadeh
(74) *Attorney, Agent, or Firm* — Young Basile

(57) ABSTRACT

Provided is an electrically driven vehicle, wherein unexpected vibration or shock is prevented during interruption of torque transmission. An electric vehicle having an electric motor as its power source is provided with an F/F calculation or operation unit, an F/B calculation or operation unit, an adder, model determination units, and target torque value switching units. The F/F calculation unit calculates a first target torque value by F/F operation. The F/B calculation unit calculates a second target torque value by F/B operation using a model. The adder adds the first target torque value and the second target torque value, to obtain a motor torque command value. The model determination units evaluate whether or not an interruption in the torque transmission to drive shafts occurs. The target torque value switching units stop the F/F- and F/B operations while torque transmission interruption is confirmed.

10 Claims, 8 Drawing Sheets

(56) References Cited

U.S. PATENT DOCUMENTS

| | | | |
|---|---|---|---|
| 2007/0276557 A1* | 11/2007 | Motosugi et al. | 701/22 |
| 2008/0058154 A1* | 3/2008 | Ashizawa et al. | 477/5 |
| 2010/0299011 A1* | 11/2010 | Fujimoto et al. | 701/22 |
| 2011/0077835 A1* | 3/2011 | Otsuka | 701/99 |
| 2012/0078456 A1* | 3/2012 | Hakumura et al. | 701/22 |
| 2013/0080013 A1* | 3/2013 | Kobayashi et al. | 701/70 |
| 2013/0090826 A1* | 4/2013 | Ohta et al. | 701/70 |

\* cited by examiner (a)          (b)

VIBRATION-INHIBITION CONTROL APPARATUS FOR ELECTRICALLY DRIVEN VEHICLE, AND VIBRATION-INHIBITION CONTROL METHOD FOR ELECTRICALLY DRIVEN VEHICLE

TECHNICAL FIELD

The present invention relates to a vibration suppression control system for an electrically driven vehicle, and vibration suppression method for the same applied to a motor torque command that is obtainable by the feedforward (F/F) control and feedback (F/B) control. The electrically driven vehicle has an electric motor as a motive power source.

BACKGROUND

Conventionally, in a vehicle propelled by an electric motor, such a vibration suppression control system is known for controlling a motor torque thereof in which a steady torque target is determined based on the various vehicle information, a first torque target is calculated by a feedforward calculation (hereinafter referred to as F/F operator or calculation), and a second torque target is calculated based on a feedback calculation (hereinafter, referred to as F/B operator or calculation), respectively. Then, by addition of the first torque target and the second torque target, a motor torque command is obtained for controlling the motor torque (see for example Japanese Laid-Open Patent Application, No. 2003-9566).

However, in the conventional vibration suppression or damping control system for a vehicle using an electric motor, in any running or travelling scene, the first torque target (i.e., F/F torque) and the second torque target (i.e., F/B torque) are calculated using a model Gp(s) defining a transfer characteristic between a vehicle torque input and motor rotation speed. Therefore, there is a problem in such driving scenes that, where torsional vibration of the drive system hardly generates, the F/F and F/B calculations malfunction to cause unexpected vibration or shock.

For example, in such running scenes with the torque transmission being interrupted where a tire or wheel spins at drive force slip, or, a clutch disposed in a drive system or driveline is slipping or released, etc., torsional vibration hardly occurs in response to the change in motor torque. In these running scenes, since the transfer characteristic between the vehicle torque input and motor rotation speed is greatly different from the previously assumed model Gp(s), the F/F and F/B calculations using the model Gp(s) causes malfunctioning.

BRIEF SUMMARY

The present invention has been made by focusing on the problems described above and has the object of providing a vibration suppression control system for an electrically driven vehicle and vibration suppression method for the same that may suppress or damp unexpected vibration or shock during interruptions in the torque transmission.

To achieve the above object, the vibration suppression control system for an electrically driven vehicle according to the present invention is configured to have, in an electrically driven vehicle using an electric motor as power source, a rotation sensor or detector, motor torque target calculation unit, first torque target calculation unit, a second torque target calculation unit, motor torque command setting mechanism, determination mechanism, and vibration suppression mechanism.

The rotation detection mechanism detects a rotation speed of the motor. The motor torque target calculation unit calculates a motor torque target based on a driver demand or request.

The first torque target value calculation unit calculates a first torque target value by a feedforward calculation or operation using a model of transfer characteristic between torque input and motor rotation speed with respect to the motor torque target value.

The second torque target calculation unit calculates a second torque target value based on the feedback calculation using a mode of transfer characteristic between the torque input and motor rotation speed with respect to the motor rotation speed.

The motor torque command setting mechanism adds the first torque target value and the second torque target value to obtain a motor torque command to the motor.

The determination mechanism determines whether or not the model of transfer characteristic between the torque input and the motor rotation speed matches an actual transfer characteristic.

The vibration suppression mechanism stops the feedforward calculation of the first torque target value based on the first torque target calculation unit and the feedback calculation of the second torque target value based on the second torque target calculation unit, and uses the motor toque target value as motor torque command value.

Thus, while the transfer characteristic model between the input torque and motor rotation speed is not determined to match the actual transfer characteristics, both the feedforward operation and feedback operation are stopped. That is, during interruptions of transmission of torque to the drive shaft, the transfer characteristic of the motor rotation speed to the torque input to the vehicle is significantly different from the model assumed in advance. Therefore, while the torque transmission is being interrupted, by stopping the feedforward operation and feedback operation using the model, malfunction can be prevented due to execution of both operations. As a result, it is possible to suppress unexpected vibration or shock to be caused during interruptions in the torque transmission.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
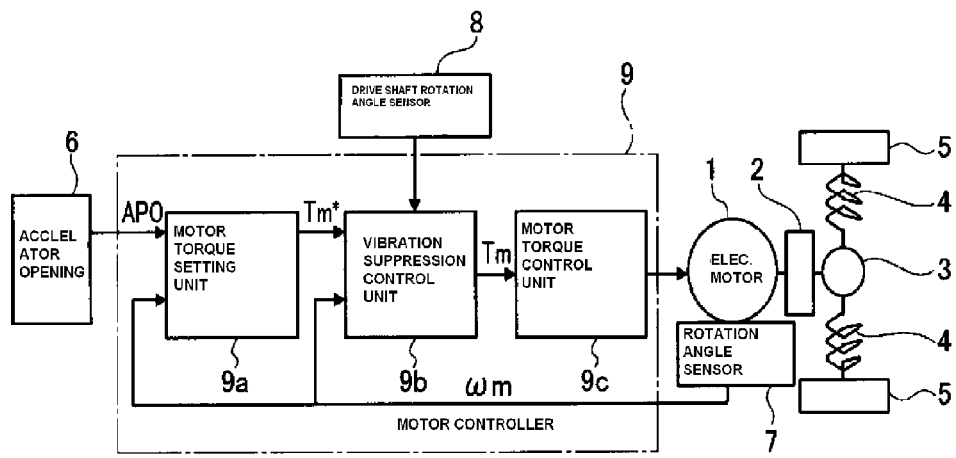
FIG. 1 is an overall configuration diagram illustrating a vibration suppression control device for an electric vehicle (an example of the electrically driven vehicle) in the first embodiment.

The mode will now be described below with reference to the first to third embodiments shown in the drawings that provide damping or suppression control system of an electrically driven vehicle and a suppression method of an electrically driven vehicle according to the present invention.

First, description is made of the configuration. FIG. 1 is an overall configuration diagram illustrating a vibration damping or suppression control device of electric vehicle (an example of the electrically driven vehicle) according to the first embodiment. The following describes the overall structure, based on FIG. 1.

As shown in FIG. 1, the driving system or driveline of an electric vehicle control device applied with the vibration suppression control device includes an electric motor 1 (motor), a stepped transmission 2, a differential gear 3, left and right driving shafts or axles 4, 4 and left and right driving wheels 5, 5.

As shown in FIG. 1, the control system of an electric vehicle control device applied with the vibration suppression control device in the first embodiment includes an accelerator opening sensor 6, a motor rotation angle sensor 7, the drive shaft rotation angle sensor 8, and a motor controller 9.

The accelerator opening sensor 6 detects the accelerator opening APO operable by the driver's accelerator operation. The motor rotation angle sensor 7 detects the motor angular velocity ωm by using a resolver and the like. The drive shaft rotation angle sensor 8 detects the angular velocity ωw of drive wheel. The motor controller 9 represents a control mechanism to control a motor torque of the electric motor 1 based on the input information, and includes a motor torque setting unit 9a, vibration suppression control unit 9b and motor torque control unit 9c.

The motor torque setting unit 9a calculates a steady state torque target value Tm* based on the accelerator opening APO from the accelerator opening sensor 6 and motor angular velocity ωm of the motor rotation angle sensor 7.

The vibration suppression control unit 9b receives the steady state torque target Tm*, motor angular velocity ωm and drive wheel angular velocity ωw. In addition, except for the period of interruption of torque transmission, a motor torque command value Tm is determined by carrying out both a F/F calculation or operation using an ideal model Gm(s) and model Gp(s) of transfer characteristic between vehicle motor input and motor rotation speed and a F/B calculation or operation using the model Gp(s) and a band pass filter H(s).

The motor torque control unit 9c drives an inverter (not shown) via a PWM signal and the like and controls the output torque of electric motor 1 to follow the motor torque command Tm.

Figure 2:
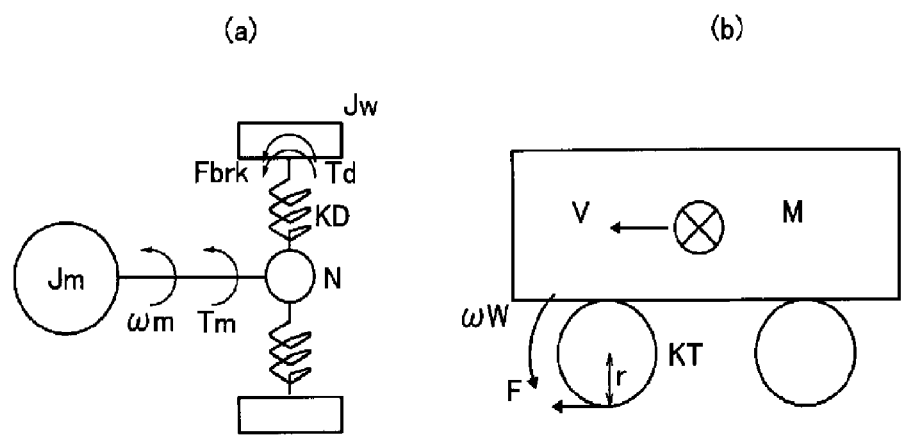
FIG. 2 is a schematic diagram of the equation of motion of the vehicle drive system where (a) shows a plan view of torsion vibration system and (b) a side view of the same, respectively.

Now, based on FIG. 2, description will be made of a model Gp(s) Gp of transfer characteristic between the input torque to vehicle and the motor speed. FIG. 2(*a*), (*b*) respectively show an explanatory diagram representing the equation of motion of the vehicle drive system, where the reference signs respectively denotes:

Jm Inertia of the motor
Jw Inertia of the drive wheel
M Vehicle mass
Kd Torsional stiffness of the drive system
Kt Friction coefficient of the tire on the road surface
N Overall gear ratio
r Loaded radius of the tire
ωm Angular velocity of the motor
Tm Torque of the motor
TD Torque of the driving wheels
F Force applied to the vehicle:
V Vehicle speed
ωw Angular velocity of the drive wheel
Fbrk Break force On the basis of FIG. 2, the following equations of motion (1) to (5) may be derived.

$$Jm \cdot d\omega m/dt = Tm - TD/N \quad (1)$$

$$2Jw \cdot d\omega m/dt = TD - rF - Fbrk \quad (2)$$

$$M \cdot dV/dt = F \quad (3)$$

$$TD = KD \int (\omega m/N - \omega w) dt \quad (4)$$

$$F = KT(r\omega w - V) \quad (5)$$

Then, based on the equations (1) to (5), transfer function Gp(s) of motor rotation speed from motor torque may be expressed as follows:

$$Gp(s) = (b_3 s^3 + b_2 s^2 + b_1 s + b_0)/s(a_4 s^3 + a_3 s^2 + a_2 s + a_1) \quad (6)$$

$$a_4 = 2Jm \cdot Jw \cdot M \quad (7)$$

$$a_3 = Jm(2Jw + Mr^2)KT \quad (8)$$

$$a_2 = \{Jm + (2Jw/N^2)\} M \cdot KD \quad (9)$$

$$a_1 = \{Jm + (2Jw/N^2) + (Mr^2/N^2)\} KD \cdot KT \quad (10)$$

$$b_3 = 2Jw \cdot M \quad (11)$$

$$b_2 = Jm(2Jw + Mr2)KT \quad (12)$$

$$b_1 = M \cdot KD \quad (13)$$

$$b_0 = KD \cdot KT \quad (14)$$

Here, examination of the poles and zero point of the transfer function of equation (6) reveals that one pole and one zero indicate values very close to each other. This is equivalent to showing the values α, β are very close in the following equation (15).

$$Gp(s) = (s+\beta)(b_2' s^2 + b_1' s + b_0')/s(s+\alpha)(a_3' s^2 + a_2' s + a_1') \quad (15)$$

Therefore, by approximating as α=β, i.e., pole-zero cancellation in the equation (15), $$Gp(s) = (b_2' s^2 + b_1' s + b_0')/s(a_3' s^2 + a_2' s + a_1') \quad (16)$$

Thus, as shown in the above equation (16), the transfer characteristic model Gp(s) of the input torque to the vehicle and the motor rotation speed is represented in the form of (second order)/(third order).

Now, description is made of the band-pass filter H(s).

H(s) serves as a feedback element reducing vibration only when set as a band-pass filter. In this instance, frequency fp is defined as a tensional resonance frequency and the transfer characteristic H(s) is configured in the following equation (17), then the vibration suppression characteristic will be approximately the same between the low-pass side and high-pass side, and the tensional vibration resonance frequency is set at about the middle of the passband on the logarithmic axis (log scale).

$$H(s)=\tau Hs/\{(1+\tau Hs)\cdot(I+\tau Ls)\} \quad (17)$$

where
TL=1/(2πfHC), fHC=fp, τH=1/(2πfLC), fLC=fp
Thus, the band-pass filter H(s) is configured by the transfer characteristic represented by equation (17).

Figure 3:
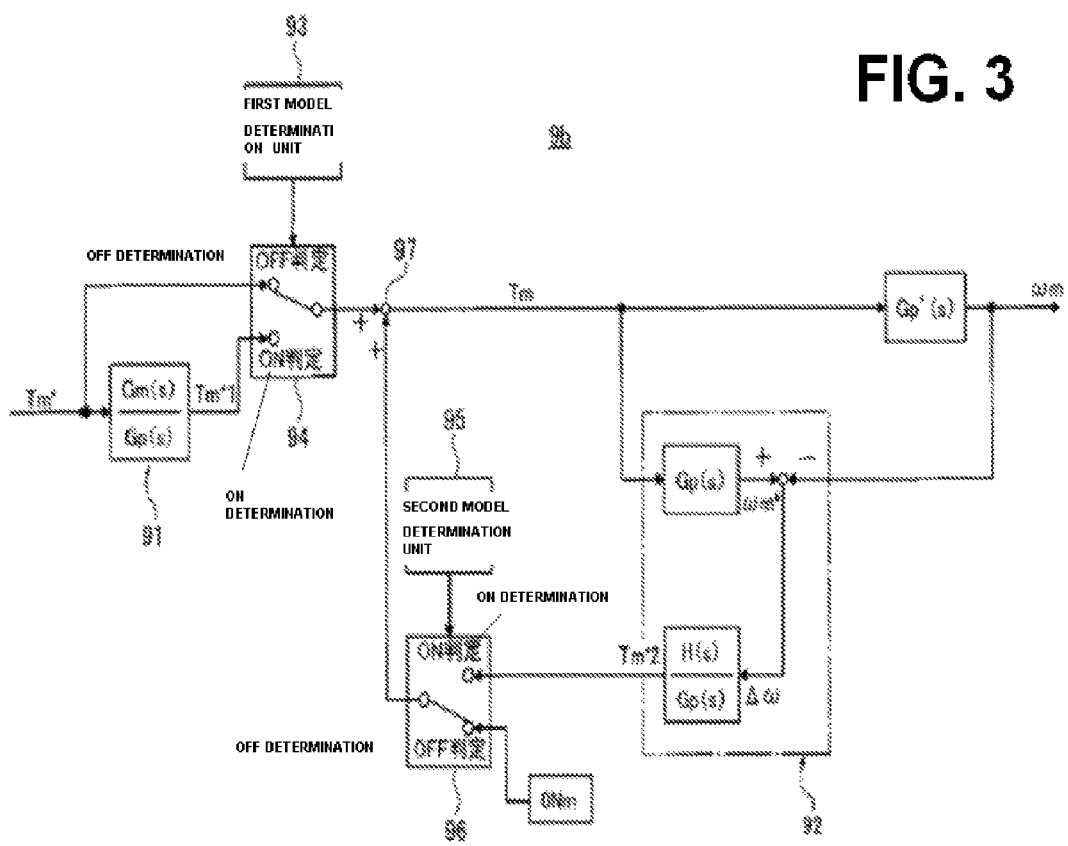
FIG. 3 is a control block diagram illustrating a vibration control unit 9b included in a motor controller 9 of the first embodiment.

FIG. 3 is a control block diagram illustrating a vibration control unit 9b included in a motor controller 9 in the first embodiment. The following describes the configuration of the damping or suppression control unit 9b based on FIG. 3.

As shown in FIG. 3, the vibration suppression control unit includes F/F calculation or operation unit 91 (first torque target value calculating means), F/B calculation or operation unit 92 (second torque target value calculating means), a first model determination unit 93 (determination means), first torque target switching unit 94 (vibration suppression means), second model determination unit 95 (determination means), second torque target switching unit 96 and adder 97 (motor torque command value setting means).

The F/F calculation unit 91 receives the steady state target value Tm*, and calculates first torque target value Tm*1 by passing through a filter, Gm(s)/Gp(s) using the ideal model Gm(s) and model Gp(s) between vehicle input torque and motor rotation speed.

The F/B calculation or operation unit 92 calculates a motor angular velocity estimate ωm # from motor torque command value Tm and model Gp(s). On the other hand, the motor angular velocity ωm is detected by the motor angular velocity or rotation speed sensor 7 when the actual plant Gp'(s) is supplied with motor torque command Tm via inverter. A deviation Δω between motor rotation speed estimate ωm # and motor rotation speed ωm is obtained, and by passing this deviation Δω through a filter composed of H(s)/Gp(s) using model Gp(s) and band-path filter H(s) the second torque target Tm*2 is calculated.

The first model determination unit 93 determines whether or not the actual transfer characteristics substantially matches model Gp(s) of transfer characteristic between vehicle torque input and motor rotation speed.

Figure 6:
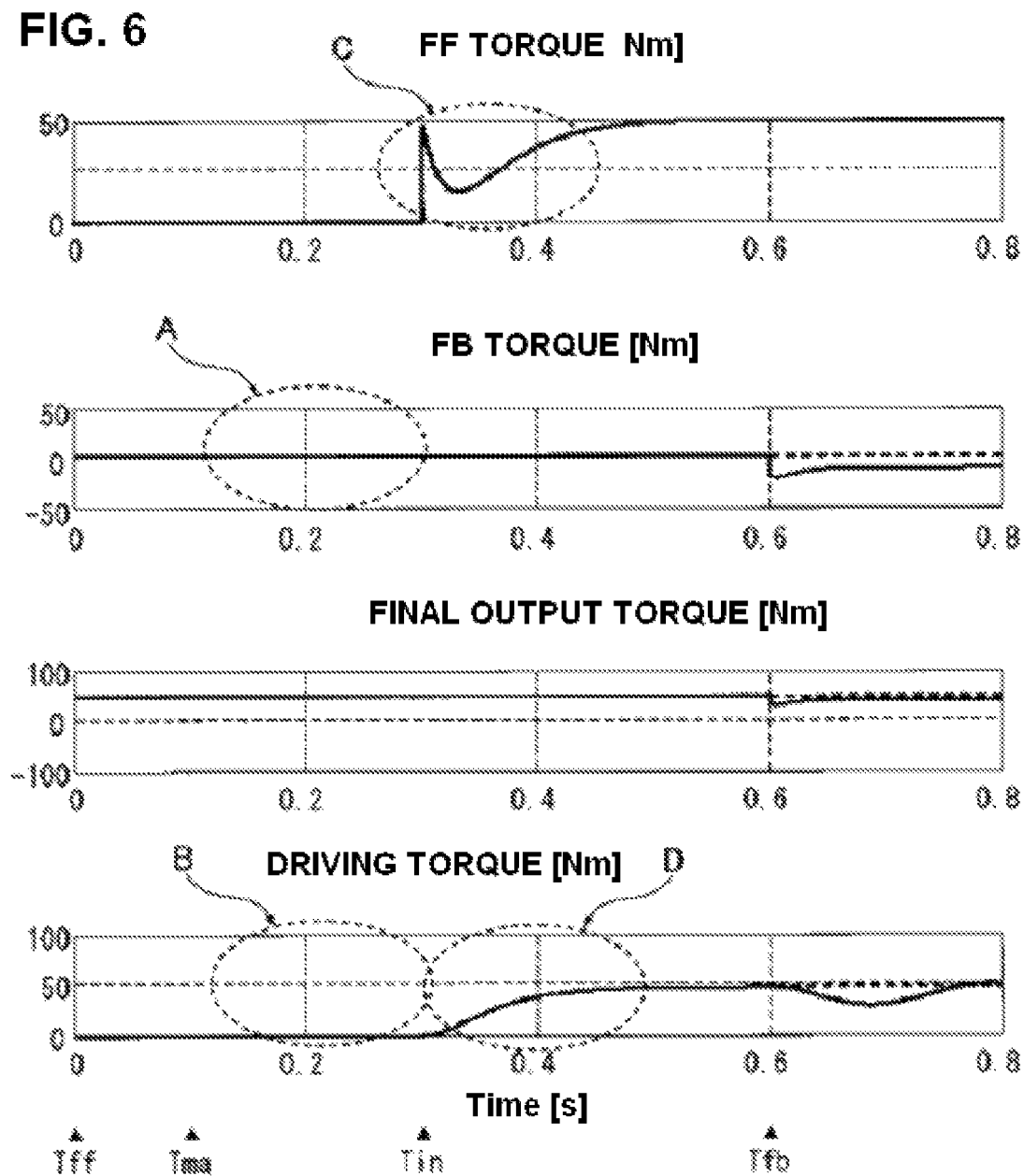
FIG. 6 is a time chart of simulation results showing the respective characteristics of FF torque, FB torque, final output torque, and driving torque at the starting of the electric vehicle that is applied with the vibration suppression control of the first embodiment.

More specifically, the determination method by the first model determination unit 93 is made in such a manner that, when an absolute value of the difference between the motor angular velocity or rotation speed ωm detected by motor rotational angle sensor 7 and drive wheel angular velocity ωw is below or equal to a predetermined value, the substantial match will be confirmed and an ON determination will be made (for example, time Tff in FIG. 6 represents "a substantial match determination time").

On the other hand, when the absolute value of the difference between the motor angular velocity ωm and drive wheel angular velocity ωw exceeds the predetermined value, then a torque interruption condition is confirmed where the actual transfer characteristic differs from model Gp(s). Note that the drive shaft angular velocity ωw, is converted to obtain the corresponding angular velocity of the motor shaft considering the gear ratio of step transmission 2. However, when the gear ratio or speed ratio across electric motor 1 through drive wheel 5 is not definitive, the speed ratio at termination of shifting process may be used. In addition, when the first model determination unit 93 determines for ON determination, then F/F calculation unit 91 starts the F/F calculation.

The first torque target value switching unit 94 above is a switch for switching the output based on the determination result of the first model determination unit 93. More specifically, when the determination result at first model determination unit 93 is OFF determination, then a steady state torque target value Tm* will be sent to adder 97. When the first model determination unit 93 determines an ON determination, the first torque target Tm*1 will be output to adder 97.

The second model determination unit 95 determines whether or not the actual transfer characteristic completely matches the model of transfer characteristic Gp(s) between vehicle torque input and motor rotation speed.

More specifically, the determination method employed in this second model determination method is such that, when the absolute value of a difference between the motor angular velocity ωm detected by motor rotation angle sensor 7 and drive wheel angular velocity ωw is kept below or equal to a predetermined value for a predetermined time, a complete match will be confirmed for ON determination (for example, time Tfb in FIG. 6 represents "the complete match determination timing"). On the other hand, when the absolute value of a difference between the motor angular velocity ωm and drive wheel angular velocity ωw exceeds the predetermined value, or the absolute value of the difference is kept below or equal to the predetermined value for less than the predetermined time, then interruption of torque transmission condition is confirmed by the OFF determination. In other words, since the second model determination unit 95 requires the predetermined time of ON determination, the timing of ON determination is always later than the first model determination unit 93. The drive shaft angular velocity ωw is converted in the same way as the first model determination unit 93, so that the corresponding angular velocity of the motor shaft is available by using gear ratio or speed ratio of a multi-stage transmission 2. However, when the speed ratio across electric motor 1 through drive wheels 5, 5 is not definitive, then the speed ratio at the shifting process completion will be used. In addition, following the ON determination by first model determination unit 93, F/B calculation by F/B calculation unit will be started.

The second torque target switching unit 96 is a switch that switches the output based on the determination result of the second model determination unit 95. More specifically, when the determination result of the determination unit 95 is OFF determination, "0" Nm will be outputted to adder 97. When the determination result of second model determination result indicates an ON determination, the second torque target value Tm*2 will be outputted to adder 97.

The adder 97 combines or adds the output from the first torque target switching unit 94 and the output from the second torque target switching unit 96 to form or set a motor torque command value Tm. When both the first torque target switching unit 94 and the second torque switching unit 96 indicate ON determination, Tm will be set to Tm*1+Tm*2. When both the first torque target switching unit 94 and the second torque target switching unit 96 indicates OFF determination, Tm will be set to Tm*. When the first torque target switching unit 94 is for ON determination while the second torque target switching unit 96 indicates OFF determination, Tm will be made as Tm*1.

Now, the operation is explained. First, a description of the "Problem of the comparative example." is made. Subsequently, the operations of vibration damping or suppression with respect to the electric vehicle in the first embodiment will be explained by subdividing the "Operation of vibration suppression during a running scene where the transfer characteristic is different from model Gp(s)" and "the operation of vibration suppression where the transfer characteristic shifts to a model-match.

Figure 4:
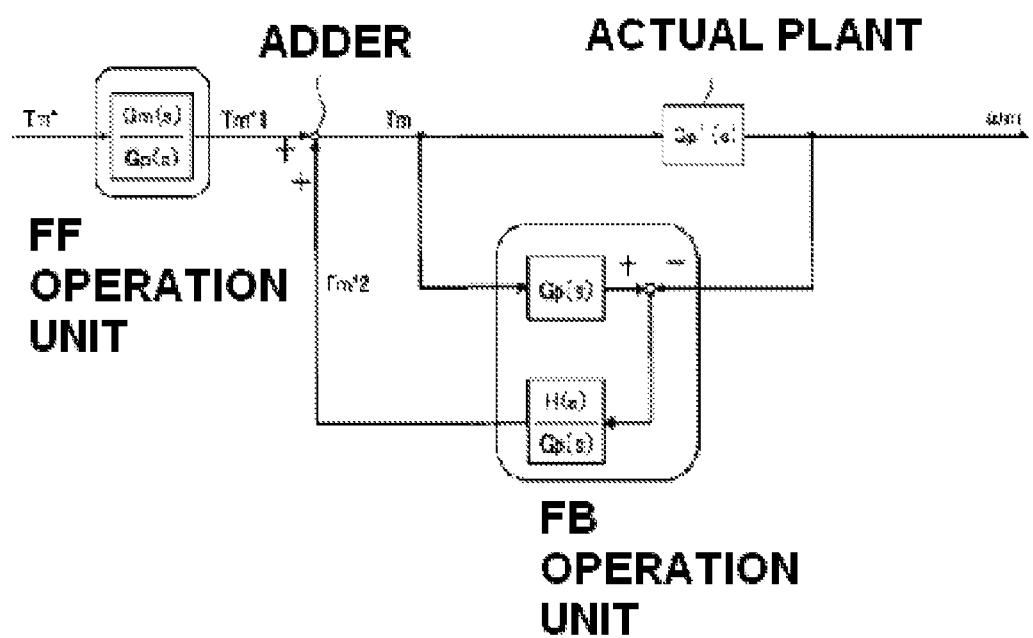
FIG. 4 is a control block diagram showing a vibration suppression control unit in the comparative example.

It is assumed that in Comparative Example, as shown in FIG. 4, vibration suppression unit is comprised of F/F calculation unit, F/B calculation unit, and adder.

The F/F calculation unit receives a steady state torque target Tm* and calculates a first torque target Tm*1 by passing through an ideal model Gm(s) and Gp(s) between vehicle torque input and motor rotation speed. The steady state target Tm* is determined based on accelerator opening and motor rotation speed.

The F/B calculation unit calculates a motor rotation speed estimate based on transfer characteristic Gp(s) between the vehicle torque input and motor rotation speed. Then, by inputting the difference between the motor speed estimate and a detected value and through a F/B calculation passing through a filter H(s)/Gp(s) using model Gp(s) and a band-pass filter H(s) to calculate a second torque target Tm*2.

The adder add the first torque target Tm*1 and the second torque target Tm*2 to obtain a motor torque command Tm. Then, a control is carried out in such a way that the actual output torque of motor matches or follows the motor torque command Tm.

In the Comparative Example, in every running condition, based on the difference between the motor rotation speed detected value and motor rotation speed estimate calculated by model Gp(s) is used to calculate a F/B torque (second torque target Tm*2). Therefore, in such running scenes where the driveline vibration hardly occurs in response to a motor torque change (for example, running scenes (a), (b) explained below), since the transfer characteristic of motor rotation speed with respect to torque input to vehicle is greatly different from the previously estimated model Gp(s), so that the F/B calculation malfunctions with unexpected vibration or shock accompanied.

(a) If the friction coefficient between the drive wheel and the road surface is small, and the drive wheels are slipping excessively, the tire just spins since the reaction force from the road surface is smaller despite the change in the motor torque so that the driveline twists.

(b) If, in a system having one or more clutches for selectively connecting and disconnecting of power between drive motor and drive wheels, the clutch is slipping or released, the transmission of torque to driving wheels despite the motor torque change will be interrupted by a clutch so that the motor simply rotates idly without twisting the driveline.

In order to cope with the malfunction of the F/B calculation above, possible strategy would be to start the operation or calculation of F/B after having confirmed that the transfer characteristic of the rotation speed of the motor with respect to the input torque to the vehicle is consistent with the model Gp(s). In this case, however, since the inevitable measurement delay or tolerance in relevant sensors that measures the vehicle state will make it difficult to determine at the perfect timing. Therefore, in order to prevent a malfunction of the F/B operation or calculation, it is necessary to reliably determine though with a bit slower timing than the actual. However, there is a possibility of vibration due to the change in steady state torque when, during the delayed time period, the steady state target torque changes without working a F/F operation or calculation.

Figure 5:
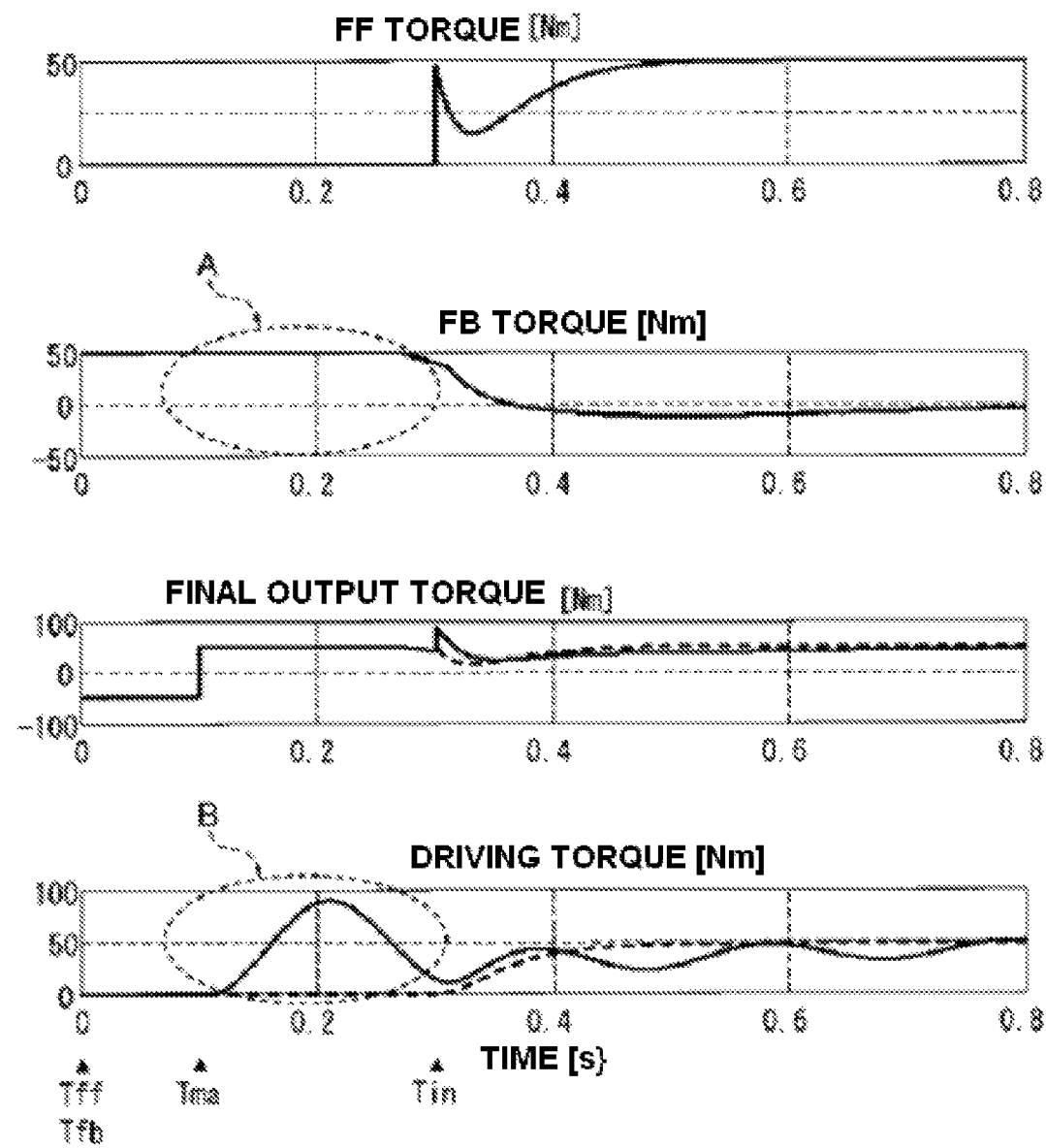
FIG. 5 is a time chart of simulation results showing the respective characteristics of FF torque, FB torque, final output torque, and driving torque at the starting of the electric vehicle that is applied with the vibration suppression control of the comparative example.

Now, the simulation results of the Comparative Example will be described with reference to FIG. 5. The correlation or correspondence between each waveform shown in FIG. 5 and the block diagram in FIG. 4 is as follows:

"FF torque"="first torque target value Tm*1"
"FB torque"="second torque target value Tm*2"
"final output torque"="Tm*1+Tm*2"

Now, description will be made of starting operation (example of running scenes). For comparison of problem, the OFF condition in F/B operation is added.

Time at which transfer characteristic of motor rotation speed with respect to the vehicle input torque matches the actual model Gp(s) Tma: 0.1 [s]
Steady torque target value input time Tin: 0.3 [s]
F/F calculation start time Tff: 0.0 [s]
F/B calculation start time Tfb: 0.0 [s] (solid line), F/B operation OFF (dotted line)

F/B operation begins at time Tff prior to the time Tma in which the transfer characteristic of the motor rotation speed to the torque input to the vehicle actually matches the model Gp(s). Therefore, at the time at which the transfer characteristic Gp(s) of motor rotation speed against the torque input of the motor matches the actual one, due to a sudden change in control target, as shown as FB torque characteristic in FIG. 5 by arrow A, F/B calculation malfunctions. Consequently, as shown in FIG. 5 as drive torque characteristic by arrow B, a torque fluctuation becomes uncomfortable for the driver between the matching timing between model Gp(s) and actual characteristic Tma through a steady state target input time Tin. Therefore, after target value input time Tin, a periodic vibration is observed due to a periodical change in drive torque. Incidentally, the characteristics of the driving torque under ideal condition (dotted line) with F/B calculation OFF does not indicate a torque fluctuation for the time period between the time Tma of match between model Gp(s) and actual characteristic through Tin of steady state torque target input time.

[Vibration suppression operation at running scene where the transfer characteristic is different from model Gp(s)] As described above, in the running scenes where the transfer characteristic is different from model Gp(s), it is necessary to minimize the influence caused by malfunctions of F/F and F/B calculations. In the following, the vibration suppression operation will be described in a running scene in which the transfer characteristic reflecting these is different from model Gp(s).

As described above, in cases where the wheel spins at drive slip, or the clutch interposed in driveline is slipping or released, and the like, i.e., in a running scene of interruption of motor torque transmission, little tensional vibration occurs due to change in motor torque.

In such a running scene, due to the actual transmission characteristic being different from model Gp(s), the absolute value of difference between motor angular velocity ωm detected by motor rotation angle sensor 7 and drive wheel angular velocity ωw detected by drive wheel angular velocity sensor 8 exceeds a predetermined value. Therefore, in first model determination unit 93, a "0" FF determination is made as the torque transmission interruption or cut off state, and in first torque target switching unit 94, the steady torque state target Tm* is switched to be output to adder 97. Further, in second model determination unit 95 too, an "OFF" determination is made as a torque cut off state, and in second torque target switching unit 96, "0" Nm is switched to be output to adder 97. Therefore, motor torque command value Tm is given by the expression; Tm=(Tm*+0)=Tm*.

As described above, in the first embodiment, while an interruption in the torque transmission is determined, a structure has been adopted to stop the F/F and F/B operation or calculations using model Gp(s). In other words, during interruption period of torque transmission to drive wheels 5, 5, the transfer characteristic of the motor rotation speed to the torque input to the vehicle differs greatly from the model Gp assumed in advance, malfunction occurs when executing the F/F and F/B calculations using model Gp(s). Therefore, when the running scene is determined to be the discontinuity or interruption of the torque transmission, by preventing the malfunction due to executing F/F and F/B calculations, the possibility of causing unexpected vibration and shock can be reduced.

[Vibration damping or suppression effect in the running scene where shifting of transfer characteristic toward the model-match] As described above, when starting torque control from the state of both the F/F and F/B operations being zero, in order to suppress the occurrence of torque fluctuations due to malfunction of the F/B operation, starting of the operation F/F operation is preceded. Then, it is necessary to delay the start timing of the F/B operation start timing with respect to the F/F operation. The following describes the effect of damping in the driving scene where the transfer characteristic reflecting this situation works in a running state toward a model-match.

As described above, during a transition from the scene in which driving torque transmission is interrupted back to a normal torque transmission by a clutch engagement and suppression of slip drive, or the like, the stopped F/F and F/B calculations are required to return. In other words, based on the disturbance torque caused by gear backlash or the like, the inhibitory effect of twisting vibration due to the driving force transmission system should be obtained by F/F and F/B calculations In such a transitional state of running scene, since the transfer characteristic of motor rotation speed in response to vehicle torque input gradually approaches the model assumed previously, the absolute value of difference between the motor angular velocity ωm detected by motor rotation angle sensor 7 and drive wheel angular velocity ωw detected by the drive shaft rotation angle sensor 8 is within the predetermined value. Therefore, in the first model determination unit 93, an ON determination is made that the actual transfer characteristic is substantially consistent with model Gp(s), and in first torque target switching unit 94, the first torque target Tm*1 is switched to be output to adder 97.

On the other hand, in the transition state of the running scene, in order for the transfer characteristic of the rotation speed of the motor with respect to the input torque to the vehicle to exactly match the model Gp(s) previously assumed, it is necessary to wait for elapse of a predetermined time in which the absolute value of difference between the motor angular velocity ωm and the drive wheels motor angular velocity ωw stays within the predetermined value for a predetermined time. Thus, in second model determination unit 95, after a predetermined time has elapsed from when the absolute value of difference between the motor angular velocity ωm and drive wheel angular velocity ωw is kept within a predetermined value, an ON determination is made, and in second torque target switching unit 96, the second torque target Tm*2 is switched to be output to adder 97.

Thus, during a time period in which first torque target switching unit 94 makes ON determination or judgment and second torque target switching unit 96 makes OFF determination, in the adder 97, motor torque command value Tm is given by an equation; Tm=Tm*1. Moreover, when both the first torque target switching unit 94 and second torque target switching unit 96 make ON determination, in adder 97, motor torque command Tm is given by the equation Tm=Tm*1+Tm*2.

Now, a description is made of the simulation results of the first embodiment with reference to FIG. 6. The correspondence or correlation between each waveform in FIG. 6 and block diagram in FIG. 3 is as follows:

"FF torque"="first torque target value Tm*1"
"FB torque"="second torque target value Tm*2"
"final output torque"="Tm*1+Tm*2"

Then, a description will be made of starting operation of FIG. 6 (example of a running scene). The OFF condition of F/B calculation is added for comparison.

Time at which transfer characteristics of motor speed with respect to the vehicle torque input actually matches model Gp(s) Tma: 0.1 [s]
Steady torque target value input time Tin: 0.3 [s]
F/F operation start time (Time at substantial match decision) Tff: 0.0 [s]
F/B operation start time (Time at exact match decision) Tfb: 0.6 [s] (solid line),
F/B operation OFF (dotted line)

Tma is defined as model match time at which the transfer characteristic of motor speed with respect to vehicle torque input actually matches model Gp(s). F/B calculation starts at the exact match decision time Tfb (0.6 [s]) that is a timing later than the model match time Tma (0.1 [s]). Therefore, malfunction of F/B calculation generated in Comparative Example may be prevented here (arrow A, FIG. 6), and a torque fluctuation posing discomfort on driver may be suppressed (arrow B, FIG. 6).

Also, F/F operation starts at a timing earlier than the model match time Tma (0.1 [s]), i.e., at a substantial match time Tff (0.0 [s]). Therefore, as shown in FF torque characteristic indicated by arrow C in FIG. 6, FF operation works as intended, and, as shown in drive torque characteristic indicated by arrow D in FIG. 6, a transient response close to ideal state (dotted line) may be achieved.

As described above, in the first embodiment, when determining a transition to the start of the torque transmission from the broken or interrupted transmission of torque to drive shafts 5,5, such a configuration is adopted in which FF operation precedes F/B operation. More specifically, based on the determination of torque transmission start, when both the F/F operation and F/B operation would be started at the same time, at the timing at which the transfer characteristic actually matches model Gp(s) previously assumed, control objective or target will be changed abruptly, thus F/B operation malfunctions and transmission torque fluctuates with incurring possible tensional vibration of driveline (see Comparative Example).

In contrast, since the FF operation starts to work in response to change in steady torque prior to the timing at which transfer characteristic actually matches model Gp(s) previously assumed, the vibration induced due to the change in steady state torque after the transfer characteristic has matched the model Gp(s) previously assumed may be prevented. In addition, the malfunction due to F/B operation conducted prior to the actual match of transfer characteristic with model Gp(s) previously defined may be prevented because of F/B operation being carried out later than the matched state. Consequently, in such running scenes such as at vehicle starting operation, or, at engagement of released clutch during vehicle travelling, and the like, i.e. the torque transmission start region, an unexpected vibration and shock may be suppressed.

Now, technical effects will be described. In the vibration suppression control system for an electric vehicle in the first embodiment, the following effects may be achieved.

An electrically driven vehicle (electric vehicle) having an electrically driven motor (electric motor 1), as power source; comprising:

an rotation speed detector (motor rotation angle sensor 7) for detecting rotation speed (motor angular velocity ωm) of the motor (electric motor 1);

a motor torque target calculation unit (motor torque setting unit 9$a$) for calculating a motor torque target value (steady state torque target Tm*) in response to driver request;

a first torque target calculation unit (F/F operation unit 91) for calculating a first torque target Tm*1 by F/F operation or calculation using transfer characteristic between torque input to motor rotation speed, in response to the motor torque target value (steady state torque target value Tm*);

a second torque target calculation unit (F/B operation unit 92) for calculating a second torque target Tm*2 by F/B operation or calculation using transfer characteristic between torque input to motor rotation speed, based on the rotation speed (motor angular velocity ωm) of the motor (electric motor 1);

a motor torque command setting mechanism (adder 97) by adding the first torque target Tm*1 and the second torque target Tm*2 to obtain the motor torque command value Tm to the motor (electric motor 1);

a determination mechanism (first model determination unit 93, second determination unit 95) to determine whether or not the transfer characteristic model Gp(s) between the torque input and motor rotation speed matches actual transfer characteristic; and a vibration suppression mechanism (first torque target switching unit 94, second torque target switching unit 96) for setting the motor torque target (steady state torque target Tm*) as the motor torque command Tm during the time period in which the transfer characteristic between the torque input and motor rotation speed Gp(s) is not determined to match the actual transfer characteristic, while stopping the F/F operation of the first torque target Tm*1 using the first torque target calculation unit (F/F operation unit 91) and the F/B operation of the second torque target Tm*2 using the second torque target calculation mechanism (F/B calculation or operation unit 92).

Therefore, it is possible to provide a vibration damping or suppression control device for an electrically driven vehicle (electric vehicle) to prevent unexpected vibration or shock from generating during a discontinuity state in the torque transmission.

(2) The vibration suppression mechanism (first torque target switching unit 94, second torque target switching unit 96) calculates the motor torque command Tm upon determination of recovery condition being met by starting the F/F calculation or operation of the first torque target Tm*1 using the first torque target calculation unit (F/F operation unit 91) before the F/B operation of the second torque target Tm*2 using the second torque target calculation unit (F/B operation unit 92). Therefore, in addition to the effects of (1), it is further possible to suppress unexpected vibration or shock in the transitional region to torque transmission start from torque transmission interruption.

(3) The determination mechanism (first model determination unit 93, second model determination unit 95) determines that the transfer characteristic Gp(s) between torque input and motor rotation speed is not consistent with the actual transfer characteristic when the absolute value of difference between motor angular velocity ωm and drive wheel angular velocity ωw exceeds a predetermined value. Therefore, in addition to the effect of (1) or (2), based on the absolute value of the difference between the motor angular velocity ωm and the drive wheel angular velocity ωw, the unmatched state between the transfer characteristic Gp(s) between torque input and motor rotation speed and actual transfer characteristic with high precision.

(4) The determination mechanism (first model determination unit 93, second model determination unit 95) determines that the recovery condition has been satisfied when the absolute value of difference between motor angular velocity ωm and drive wheel angular velocity ωw is within a predetermined value. Therefore, in addition to the effects of (2) or (3), based on the absolute value of the difference between the motor angular velocity ωm and the drive wheel angular velocity ωw, the transition to recovery from a state in which the transfer characteristic model Gp(s) between torque input and motor rotation speed does not match the actual transfer characteristic.

(5) The first torque target calculation unit (F/F operation unit 91) receives a steady state torque target Tm* determined based on the driver request, and calculates a first torque target Tm*1 by F/F operation or calculation passing through a filter Gm(s)/Gp(s) using an ideal model of transfer characteristic between torque input and motor rotation speed and a model Gp(s).

The second torque target calculation unit (F/B operation unit 92) calculates a motor rotation speed estimate (ωm # from the transfer characteristic model Gp(s) between torque input to vehicle and motor rotation speed, receives a difference Δω between the motor rotation speed estimate (ωm # and motor rotation speed detected value ωm, and calculates a second torque target Tm*2 by F/B operation passing through a filter H(s)/Gp(s) using the model Gp(s) and a band-pass filter H(s).

Therefore, in addition to the effects of (1) to (4), by using the model Gp(s) previously assumed for F/F operation and F/B operation, a tensional vibration in the driveline may be effectively suppressed due to disturbance torque during torque transmission. In addition, during the discontinuity of torque transmission, unexpected vibration or shock will be prevented from occurring due to the malfunction of F/F and F/B calculations during the discontinuity of torque transmission.

The second torque target calculation unit (F/B operation unit 92) calculates a motor rotation speed estimate ωm # from the transfer characteristic model Gp(s) between torque input to vehicle and motor rotation speed, receives a difference Δω between the motor rotation speed estimate ωm # and motor rotation speed detected value ωm, and calculates a second torque target Tm*2 by F/B operation passing through a filter H(s)/Gp(s) using the model Gp(s) and a band-path filter H(s). Therefore, in addition to the effects of (1) to (4), by using the model Gp(s) previously assumed for F/F operation and F/B operation, a tensional vibration in the driveline may be effectively suppressed due to disturbance torque during torque transmission. In addition, during the discontinuity of torque transmission, unexpected vibration or shock will be prevented from occurring due to the malfunction of F/F and F/B calculations during the discontinuity of torque transmission.

(6) The determination mechanism has a first model determination unit 93 that determines a termination of torque transmission discontinuity or interruption at a timing earlier than a reference timing at which the transfer characteristic between the vehicle torque input and motor rotation speed actually matches the previously assumed model Gp(s). Further, the determination mechanism has a second model determination unit 95 that determines the termination of torque transmission interruption at a later timing than the reference timing. The vibration suppression mechanism has a first torque target switching unit 94 that starts the F/F operation or calculation in response to the termination of torque transmission interruption by the first model determination unit 93 (ON determination) and a second torque target switching unit 96 that starts F/B operation in response to the termination of torque transmission interruption (ON determination) by the second model determination unit 95.

Therefore, in addition to the effect of (5), since the F/F operation works in response to change in steady state torque at a timing earlier than the timing at which the transfer characteristic between vehicle torque input and motor rotation speed actually matches the model Gp(s), the vibration induced due to change in steady state torque upon the match may be reliably prevented. Moreover, due to start of F/B operation before the actual match, malfunction of F/B operation by performing the F/B operation may be reliably prevented.

(7) An electrically driven vehicle (electric vehicle) that includes an electrically driven motor (electric motor 1) as power source to operate drive wheels 5, 5 by torque transmission through drive shaft 4, 4, comprising:

a torque transmission mode control step or routine for setting a motor torque command Tm to the electric motor 1 by adding a first torque target Tm*1 from F/F operation and a second torque target Tm*2 from F/B operation, during the transfer characteristic Gp(s) between torque input and motor rotation speed is consistent with the actual transfer characteristic;

a torque interruption mode control step or routine for setting the motor torque target Tm to the electric motor 1 by the steady state torque target Tm* determined based on the driver request during a running scene in which the transfer characteristic Gp(s) between torque input and motor rotation speed does not match the actual transfer characteristic while stopping the F/F and F/B operations;

a torque transitional mode control step or routine in which, upon determination of transition from the unmatched state between the transfer characteristic model Gp(s) between the torque input and motor rotation speed and the actual transfer characteristic to the matched state, F/F operation in response to the change in steady state torque is started in advance at an earlier timing of the actual match with the previously assumed model Gp(s) to determine the first torque target Tm*1 as the motor torque command, while starting the F/B operation at a later timing of the actual match of transfer characteristic with the previously assumed model Gp(s) to set a motor torque command Tm by adding the preceding first torque target value Tm*1 and a second torque target value Tm*2.

Therefore, it is possible to provide a vibration suppression method for an electrically driven vehicle (electric vehicle) that suppresses unexpected vibration or shock encountered during the torque transmission discontinuity and torque transmission starting region.

The second embodiment pertains to an example in which the motor torque command value is corrected to suppress the drive torque fluctuation in the F/B operation starting region using a filter.

Figure 7:
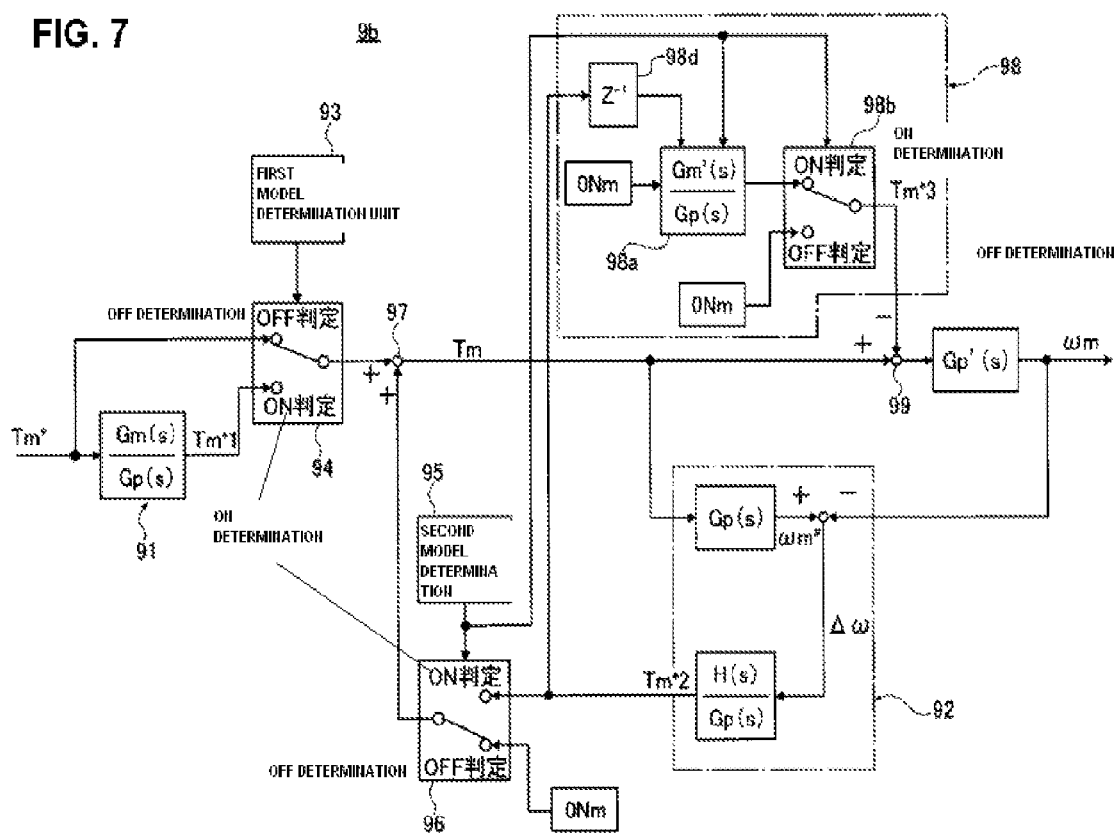
FIG. 7 is a control block diagram illustrating a vibration control unit 9b included in a motor controller 9 of the second embodiment.

First, description is made of the configuration. FIG. 7 is a control block diagram illustrating a vibration suppression control unit 9b included in a motor controller 9 in the second embodiment. The following describes the configuration of the damping or vibration suppression control unit 9b based on FIG. 7.

As shown in FIG. 7, the vibration suppression control unit 9 is provided with F/F calculation unit 91 (first torque target value calculating means), F/B calculation unit 92 (second torque target value calculating means), first model determination unit 93 (judgment means), first torque target switching unit 94 (vibration suppression means), second model determination unit 95 (judgment unit), second model determination unit 95(determination mechanism), adder 97 (motor torque command value setting mechanism), motor torque command value correction unit 98 (motor torque command value correction means), and subtractor 99.

The motor torque command value correction unit 98, upon determination of termination of torque transmission interruption (ON determination) by the second model determination unit 95, does not correct motor torque command value Tm as an input for calculating motor rotation speed estimate ωm # by F/B calculation or operation unit 92. In addition to correcting the motor torque command value corresponding to a final output torque for imparting the actual plant Gp'(s) in such a manner to connect smoothly before and after the start of F/B operation, the correction value will be reduced to zero within a predetermined time period.

The motor torque command value correction unit 98 is provided with a filter 98a composed of a second ideal model Gm'(s) and model Gp(s), correction switching unit 98b being switched upon determination result from second model determination unit 95, a storage unit 98d for storing only one sample of the second torque target value Tm*2.

The filter 98 has a characteristic represented by Gm'(s)/Gp(s). Here, model Gp(s) indicates a model representing a transfer characteristic between vehicle torque input and motor rotation speed ωm. The second ideal model Gm'(s) represents a model setting forth a response target between vehicle torque input and motor rotation speed. Each time the second model determination unit 95 makes an ON judgment or determination, the previous value of second torque target value Tm*2 is initialized to a state of unlimited number of entry. Therefore, immediately after the ON determination by the second model determination unit 95, the previous value of second torque target value Tm*2 will be output. However, 0 Nm passes through filter 98a thereafter, and the value becomes 0 Nm in a steady state.

The correction switching unit 98b is a switch for switching the output based on the determination result of the determination mechanism 95. Upon determination of OFF judgement, 0 Nm is output, upon ON judgement, an operation result passing through filter 98a containing a characteristic Gm'(s)/Gp(s) will be output.

The storage unit 98d has a function to store only one sample of the second torque target value Tm*2 and outputs a previous value of the second torque target value Tm*2.

The subtractor 99 calculates a final torque command (Tm−Tm*3) for supplying to actual plant Gp'(s) by subtracting torque correction value Tm*3 output from motor torque command correction unit 98 from motor torque command value Tm output from adder 97. Note that, since the other elements (F/F operation unit 91 through adder 97) are the same as the first embodiment, description thereof is omitted and the same reference numerals are attached to the corresponding elements.

Next, description of operation will be made. The simulation result of the second embodiment will be described with reference to FIG. 8. The correspondence or correlation between each waveform shown in FIG. 8 and those in block diagram of FIG. 7 is as follows:

"FF torque"="first torque target value Tm*1+torque correction value Tm*3"

"FB torque"="second torque target value Tm*2"
"final output torque" "=Tm*1+Tm*2+torque correction value Tm*3"

Figure 8:
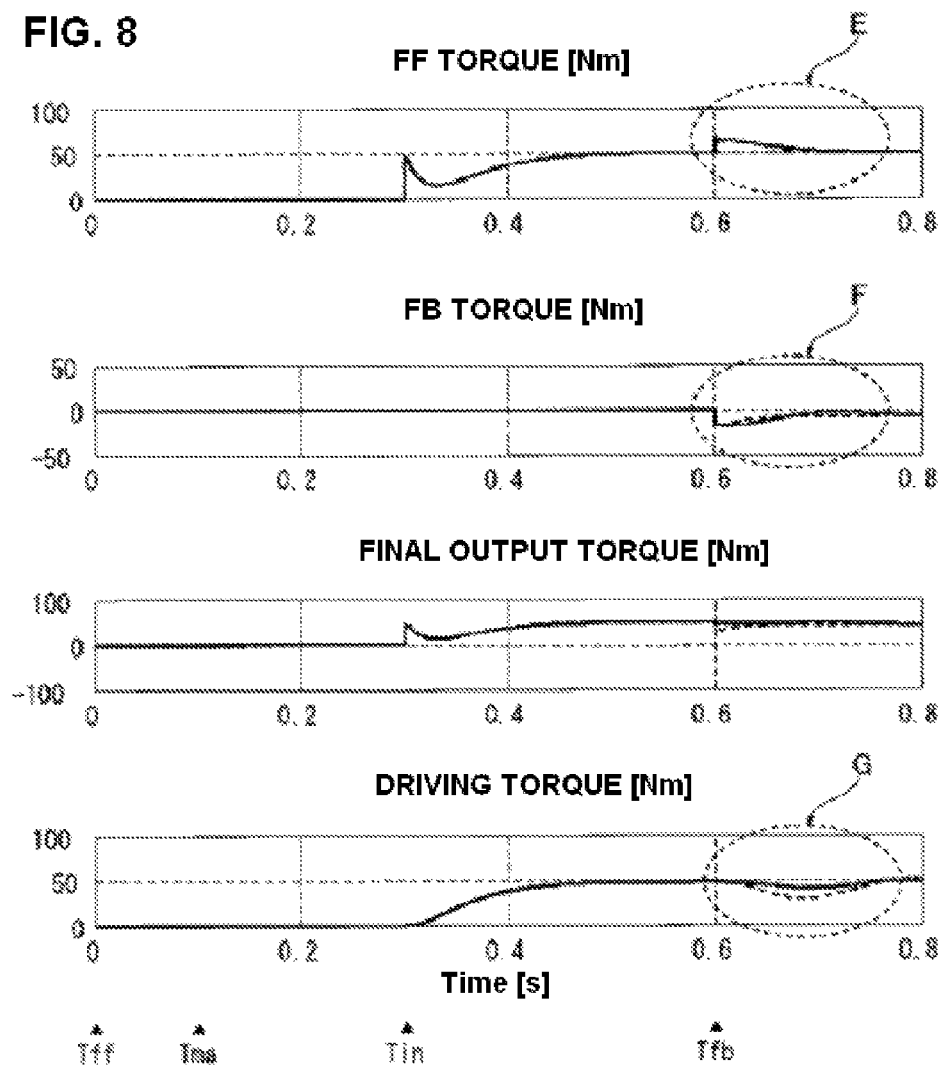
FIG. 8 is a time chart of simulation results showing the respective characteristics of FF torque, FB torque, final output torque, and driving torque at the starting of the electric vehicle that is applied with the vibration suppression control of the second embodiment.

Then, description is made of starting operation shown in FIG. 8 (an example of the running scene). Also added is an example with no correction of torque in the first embodiment for comparison.

Time at which the transfer characteristics with respect to the input torque of the motor speed actually matches the vehicle model Gp(s) Tma: 0.1 [s]

Steady state torque target value input time Tin: 0.3 [s]

F/F operation start time (Time at substantially match decision) Tff: 0.0 [s]

F/B operation start time (Time at exact match decision) Tfb: 0.6 [s] (solid line), F/B operation in the first embodiment (dotted line)

In the first and second embodiments, as shown in dotted line characteristic and the solid line characteristic indicated by arrow F in FIG. 8, immediately after the start of F/B operation, a F/B torque not necessary to suppress vibration will be output. Therefore, in the case of the first embodiment, as shown in dotted line characteristic by arrow G in FIG. 8, the driving torque fluctuates. However, in the case of the second embodiment, as shown in the solid line characteristic by arrow E in FIG. 8, a correction torque Tm*3 that cancels the unnecessary F/B torque will be output in addition to the FF output torque. Consequently, as shown in the solid line characteristic indicated by arrow G in FIG. 8, as compared to the driving torque characteristic (dotted line characteristic) in the first embodiment, the drive torque may be close to the ideal state. Note that the other effects are the same as in the first embodiment, the description thereof is thus omitted.

Now, description is made of technical effects. In the vibration suppression control apparatus for an electric vehicle in the second embodiment, the following effects may be achieved.

(8) When the second model determination unit 95 determines that the recovery condition has been met, motor torque command Tm will not be corrected that serves as an input to calculate motor rotation speed estimate ωm # by the second torque target calculation unit (F/B operation unit 92), but motor torque command corresponding to a final output torque to be input to actual plant Gp'(s) will be corrected to smoothly connect before and after the F/B operation. In addition the motor torque command correction mechanism (motor torque command correction unit 98) is provided to decrease the torque correction value Tm*3 to zero within a predetermined period of time.

Therefore, in addition to the effect of (6) in the first embodiment, by connecting smoothly the motor torque command value Tm before and after the F/B operation start, a step of second torque target value Tm2 (i.e. F/B torque) generating immediately after F/B operation start will be cancelled to be output. Moreover, by reducing the torque correction value Tm*3 to zero over the predetermined time, the occurrence of steady torque deviation may be prevented.

(9) The motor torque command correction mechanism (motor torque command correction unit 98) is provided with a filter 98a with a second ideal model Gm'(s) between the previously assumed torque input and motor rotation speed and model Gp(s). Each time the second model determination unit 95 determines that a recovery condition has been met for ON determination, immediately after the determination, a previous value is output by initializing by the previous value of second torque target value Tm*2, and after initialization, passing an "zero" input through filter 98, thereby a step of final output torque may be cancelled while avoiding production of torque step on a steady basis.

In other words, by initializing second torque target value Tm*2 (and outputting previous value) immediately after the ON determination, and allowing a "zero" input to pass through the filter 98a after initialization, with respect to torque correction Tm3, FF operation works to cancel FB torque step by FF torque. In addition, when forming a band-pass filter with transfer characteristic H(s), the second torque target Tm*2 is constantly zero in the steady state.

In other words, by initializing second torque target value Tm*2 (and outputting previous value) immediately after the ON determination, and allowing a "zero" input to pass through the filter 98a after initialization, with respect to torque correction Tm3, FF operation works to cancel FB torque step by FF torque. In addition, when forming a band-path filter with transfer characteristic H(s), the second torque target Tm*2 is constantly zero in the steady state.

The third embodiment is an example in which the motor torque command value is corrected to suppress the fluctuation of the drive torque at the start of the F/B operation through use of a change rate limit unit.

Figure 9:
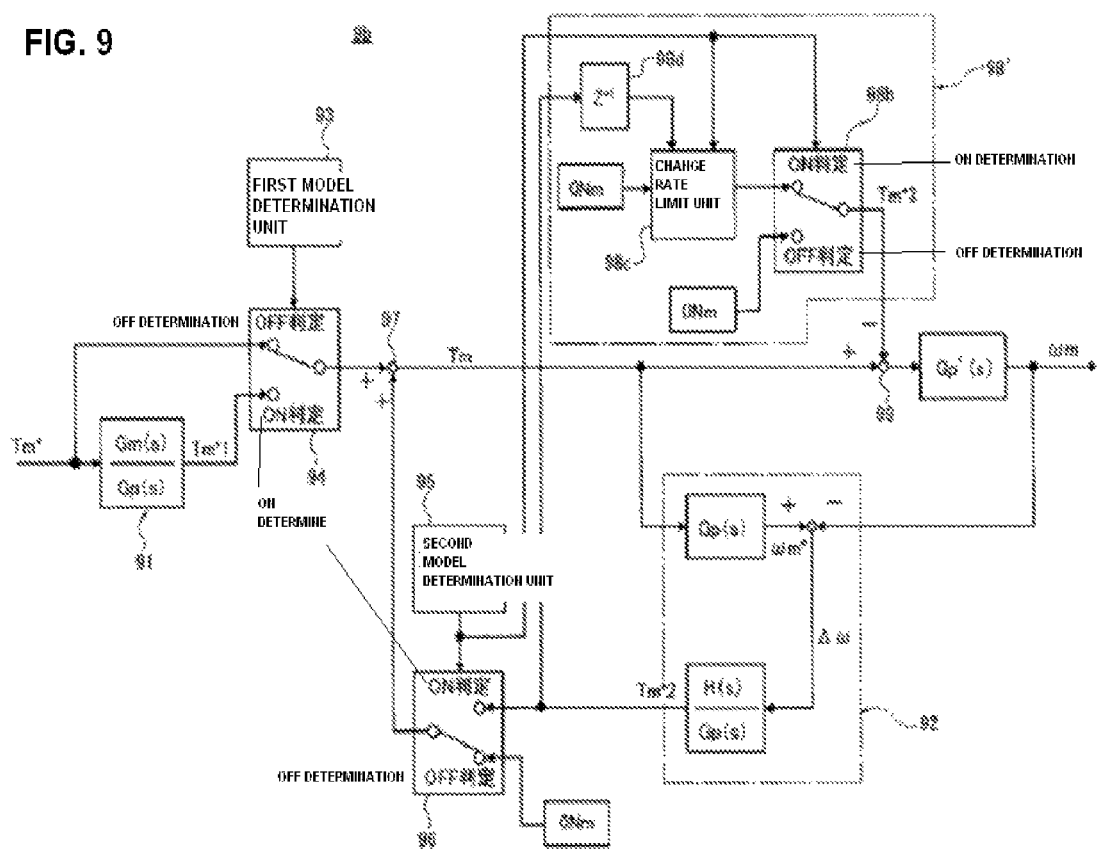
FIG. 9 is a control block diagram illustrating a vibration control unit 9b included in a motor controller 9 of the third embodiment.

First, description is made of the configuration. FIG. 9 is a control block diagram illustrating a vibration suppression control unit 9b included in a motor controller 9 of the third embodiment. The following describes the configuration of the vibration suppression control unit 9b based on FIG. 9.

As shown in FIG. 9, the vibration suppression unit 9b is provided with F/F operation unit 91 (first torque target calculation means), F/B operation unit 92 (second torque target calculation unit), first model determination unit 93 (judgment means), first torque target switching unit 94 (vibration suppression means), second model determination mechanism 95 (judgment means), second torque target switching unit 96 (vibration suppression means), adder 97 (motor torque command value setting means), motor torque command value correction unit 98' (motor torque command value correction means), and a subtractor 99.

Similar to the second embodiment, the motor torque command value correction unit 98' does not perform correction of motor torque command value Tm serving as an input to calculate motor rotation speed estimate ωm # by F/B operation unit 92 upon determination (ON judgment) by the second model determination unit 95 of termination of torque transmission discontinuity or interruption Instead, the motor torque command value corresponding to a final output torque for introduction into actual plant Gp'(s) is corrected to smoothly connect before and after the F/B operation with gradual decrease of the correction value to zero within a predetermined time.

The motor torque command value correction unit 98' is provided with change rate limit unit 98c, correction switching unit 98b for switching in response to judgment result from second model determination unit 95, and a storage unit 98d for storing only one sample of second torque target value Tm*2.

The change rate limit unit 98c limits by the rate of change set in advance not to induce vibration. Each time the second model determination unit 95 makes ON determination, by initializing by the previous data of second torque target value Tm*2, the previous value of second torque target Tm*2 is output immediately after the ON determination by second model determination unit 95, thereafter the value is output after passing "zero" Nm through change rate limiting unit with reaching 0 Nm in steady state.

It should be noted that other configurations are the same as those in the first and second embodiments, description thereof is therefore omitted and the same reference numerals corresponding configuration are attached. In addition, regarding the operation of the third embodiment, since it is almost the same as in the second embodiment, the description thereof is omitted.

Now description is made of the technical effects. In the vibration suppression control apparatus for an electric vehicle of the third embodiment, the following effects may be achieved.

(10) The motor torque command correction unit (motor torque command value correction unit 98') is provided with a change rate limit unit 98c that limits by change rate previously set not to induce vibration. Each time the second model determination unit 95 determines that the recovery condition has been satisfied (ON judgment), by initializing by the previous value of second torque target value Tm\*2 and outputting the previous value immediately after the judgment, and, after initialization, setting the value by passing zero input through the change rate limit unit 98c.

Therefore, in addition to the effect of (8) in the second embodiment, by allowing the F/F operation to act on the torque correction value Tm\*3 of motor torque command value Tm, without inducing vibration, the step of final output torque can be cancelled and continuous torque deviation may be prevented to occur.

In other words, by initializing the second torque target Tm\*2 immediately after ON determination and, after initialization, by obtaining a value obtainable by passing zero input through change rate limit unit 98c, with respect to correction value Tm\*3, FF operation unit works to counteract a FB torque step by FF torque. In addition when forming the transfer characteristic H(s) by a band-pass, second torque target Tm\*2 becomes 0 Nm in the steady state.

Therefore, in addition to the effect of (8) in the second embodiment, by allowing the F/F operation to act on the torque correction value Tm\*3 of motor torque command value Tm, without inducing vibration, the step of final output torque can be cancelled and continuous torque deviation may be prevented to occur. In other words, by initializing the second torque target Tm\*2 immediately after ON determination and, after initialization, by obtaining a value obtainable by passing zero input through change rate limit unit 98c, with respect to correction value Tm\*3, FF operation unit works to counteract a FB torque step by FF torque. In addition when forming the transfer characteristic H(s) by a band-path filter, second torque target Tm\*2 becomes 0 Nm in the steady state.

The vibration suppression system for an electrically driven vehicle according to the present invention has been described with reference to the first to third embodiments. Specific configuration is not limited to these embodiments, and a design change and additions are allowed without departing from the spirit of the invention accorded from the scope of each claim.

In the first to third embodiments, an application example is shown with respect to an electric vehicle equipped with electric motor 1 and a stepped transmission 2. However, such an example may also be applicable to an electric vehicle equipped with an electric motor and a reduction gear mechanism. In addition, in the case of electrically driven vehicles, application is also feasible to hybrid electric vehicle, fuel cell vehicle and the like.

The invention claimed is:

1. A vibration suppression system for an electrically driven vehicle having an electrically driven motor as a power source, comprising:

a rotation speed detector configured to detect a motor rotation speed;

a motor torque target calculation unit configured to calculate a motor torque target value in response to a driver request;

a first torque target calculation unit configured to calculate a first torque target by feedforward (F/F) operation using a model transfer characteristic between a torque input and the motor rotation speed with respect to the motor torque target value;

a second torque target calculation unit configured to calculate a second torque target by feedback (F/B) operation using the model transfer characteristic between the torque input and the motor rotation speed with respect to the motor rotation speed;

a motor torque command setting mechanism configured to add the first torque target and the second torque target to obtain the motor torque command to the motor;

a determination mechanism configured to determine whether or not the model transfer characteristic between the torque input and motor rotation speed matches an actual transfer characteristic; and a vibration suppression mechanism configured to set the motor torque target value as the motor torque command during at-he time period in which the transfer characteristic between the torque input and motor rotation speed is not determined to match the actual transfer characteristic, while stopping the F/F operation of the first torque target using the first torque target calculation unit and the F/B operation of the second torque target using the second torque target calculation unit.

2. The vibration suppression system for an electrically driven vehicle as claimed in claim 1, wherein the vibration suppression mechanism calculates the motor torque command upon determination of a recovery condition being met by starting the F/F operation of the first torque target using the first torque target calculation unit before the F/B operation of the second torque target using the second torque target calculation unit.

3. The vibration suppression system for an electrically driven vehicle as claimed in claim 1, wherein the determination mechanism determines that the model transfer characteristic between the torque input and the motor rotation speed is not consistent with the actual transfer characteristic when an absolute value of a difference between a motor angular velocity and a drive wheel angular velocity exceeds a predetermined value.

4. The vibration suppression system for an electrically driven vehicle as claimed in claim 2, wherein the determination mechanism determines that the recovery condition has been satisfied when an absolute value of a difference between a motor angular velocity and a drive wheel angular velocity is within a predetermined value.

5. The vibration suppression system for an electrically driven vehicle as claimed in claim 1, wherein:

the first torque target calculation unit receives a steady state torque target determined based on the driver request, and calculates the first torque target by F/F operation passing through a filter using an ideal model of transfer characteristic between the torque input and the motor rotation speed and a model; and the second torque target calculation unit calculates a motor rotation speed estimate from the model transfer characteristic between the torque input to the vehicle and the motor rotation speed, receives a difference between the motor rotation speed estimate and a motor rotation speed detected value, and calculates a second torque target by F/B operation passing through a filter using the model and a band-pass filter.

6. The vibration suppression system for an electrically driven vehicle as claimed in claim 5, wherein the determination mechanism has a first model determination unit that determines a termination of a torque transmission interruption at a timing earlier than a reference timing at which the actual transfer characteristic between the vehicle torque input and motor rotation speed actually matches the model transfer characteristic previously assumed, and a second model determination unit that determines the termination of torque transmission interruption at a later timing than the reference timing, and wherein the vibration suppression mechanism has a first torque target switching unit that starts the F/F operation in response to the termination of the torque transmission interruption by the first model determination unit and a second torque target switching unit that starts F/B operation in response to the termination of the torque transmission interruption by the second model determination unit.

7. The vibration suppression system for an electrically driven vehicle as claimed in claim 6, wherein, when the second model determination unit determines that the recovery condition has been met, the motor torque command will not be corrected that serves as an input to calculate the motor rotation speed estimate by the second torque target calculation unit, but the motor torque command corresponding to a final output torque to be input to an actual plant will be corrected to smoothly connect before and after the F/B operation while decreasing a torque correction value to zero within a predetermined period of time.

8. The vibration suppression system for an electrically driven vehicle as claimed in claim 7, wherein the motor torque command correction unit is provided with a filter with a second ideal model between the torque input previously assumed and the motor rotation speed and the model, and wherein, each time the second model determination unit determines that a recovery condition has been met, immediately after the determination, a previous value is output by initializing the previous value of second torque target value, and after initializing, passing a "zero" input through the filter.

9. The vibration suppression system for an electrically driven vehicle as claimed in claim 7, wherein the motor torque command correction unit is provided with a change rate limit unit that limits by change rate previously set not to induce vibration, and wherein each time the second model determination unit determines that the recovery condition has been satisfied, initializing the previous value of second torque target value and outputting the previous value immediately after the judgment, and, after initializing, setting the value by passing zero input through the change rate limit unit.

10. A vibration suppression method for an electrically driven vehicle that includes an electric motor as a power source to operate drive wheels by torque transmission through a drive shaft, comprising:
setting a motor torque command to the electric motor by adding a first torque target value of F/F operation and a second torque target value of F/B operation, during a matched state in which a model transfer characteristic between a torque input and a motor rotation speed is consistent with an actual transfer characteristic;
setting the motor torque target command to the electric motor to a steady state torque target determined based on the driver request during an unmatched state in which the model transfer characteristic between torque input and motor rotation speed does not match the actual transfer characteristic while stopping the F/F and F/B operations; and
upon determination of transition from the unmatched state between the model transfer characteristic between the torque input and the motor rotation speed and the actual transfer characteristic to the matched state, F/F operation in response to the change in steady state torque is started at an earlier timing of the actual match with the previously assumed model to set the first torque target as the motor torque command, while starting the F/B operation at a later timing of the actual match of transfer characteristic with the previously assumed model to set the motor torque command by adding the first torque target value preceded by the F/F operation and the second torque target value.

* * * * *